United States Patent [19]
Billias et al.

[11] Patent Number: 5,643,445
[45] Date of Patent: Jul. 1, 1997

[54] REMOVABLE STORM WATER SCREEN AND OVERFLOW DEVICE

[76] Inventors: Charles Billias, 119 Chipola, Cocoa Beach, Fla. 32931; Rajesh Verma, 7780 NW. 78th Ave. #1,213, Tamarac, Fla. 33321; Ray Waton, 360 Earrusso St., Cocoa, Fla. 32926

[21] Appl. No.: 520,026

[22] Filed: Aug. 28, 1995

[51] Int. Cl.$^6$ .................................................. B01D 29/11
[52] U.S. Cl. ....................... 210/162; 210/163; 210/434; 210/459
[58] Field of Search .......................... 210/154, 162, 210/163, 435, 433.1, 434, 459, 170

[56] References Cited

U.S. PATENT DOCUMENTS

| | | | |
|---|---|---|---|
| D. 267,335 | 12/1982 | Axel et al. | D23/1 |
| 788,556 | 2/1905 | Van Buskirk | 210/163 |
| 1,451,394 | 4/1923 | Hurst | 210/162 |
| 1,675,714 | 7/1928 | Koch | 210/163 |
| 2,669,197 | 2/1954 | Van Duzer | 210/162 |
| 3,282,430 | 11/1966 | Kinne | 210/162 |
| 3,695,253 | 10/1972 | Dorris | 94/31.3 |
| 3,815,748 | 6/1974 | Johannessen | 210/163 |
| 4,268,390 | 5/1981 | Cunningham | 210/232 |
| 4,419,232 | 12/1983 | Arntyr et al. | 210/164 |
| 4,793,728 | 12/1988 | Ellis | 404/2 |
| 5,034,122 | 7/1991 | Wiesemann | 210/162 |
| 5,133,619 | 7/1992 | Murfae et al. | 404/4 |
| 5,223,154 | 6/1993 | MacPherson, Jr. | 210/790 |
| 5,232,587 | 8/1993 | Hegemier et al. | 210/162 |
| 5,284,580 | 2/1994 | Shyh | 210/163 |
| 5,297,367 | 3/1994 | Sainz | 52/12 |
| 5,372,714 | 12/1994 | Logue, Jr. | 210/164 |
| 5,405,539 | 4/1995 | Schneider | 210/163 |

*Primary Examiner*—Christopher Upton
*Attorney, Agent, or Firm*—Brian S. Steinberger; Law Offices of Brian S. Steinberger

[57] ABSTRACT

Debris removing screen basket and overflow apparatus embodiments for use in a storm collection sewer. The device has two embodiments, each including a central panel with foldable wings in each side of the central panel. During initial assembly, the wings are folded up around the central panel for insertion through a manhole cover. Each wing can have an optional extension panel that slidable attached to each wing by bolts/screws and nuts through longitudinal slots. In the first embodiment, the wings, extension panels and the central panel form a single type panel that is inclined at a variable angle so as to suit various floor conditions at a particular location. In the first embodiment the panel and wings have a front edge that sits on the inlet drain floor and a top edge touching an upper ridge of the basket. The inclined variable angle can be between approximately 35 and 75 degrees but preferably at approximately 52 degrees, with the top edges leaning in the direction of the outlet pipe from the storm collection sewer. Both wings and and extension panels have angled deflector top portions while the central panel does not have a deflection portion. A screen mesh basket is supported behind the central panel by hooks. Storm water and debris entering the street grate area fill up the area in front of the wings, extension panels and central panel. The rising water when reaching the height of the deflector portions is forced over the top ridge of the central panel and into the basket. In the second embodiment the central panel and the wings form a ramp chute which angle down from street level into the basket itself. In the second embodiment, overflowing water can run around the sides of the filled basket. Filled baskets in both embodiments are removable by a single worker while the remaining structure is left undisturbed.

13 Claims, 11 Drawing Sheets

REMOVABLE STORM WATER SCREEN AND OVERFLOW DEVICE

This invention relates to storm water collection sewers and more particular to removable screen devices for insertion into roadway storm water collection sewers to prevent and filter debris from entering the sewers without inhibiting or blocking excess storm water runoff.

BACKGROUND AND PRIOR ART

Storm water runoff generally causes numerous problems to existing roadways. For example, the storm water can be of a great flow capacity that is variable in volume. Furthermore, the storm water runoff usually includes different types of debris such as but not limited to branches, twigs leaves, garbage, refuse and the like. The debris can themselves cause much problems down a storm sewer such as clogging up existing drain lines and the polluting of local waterways with the refuse and garbage.

Existing storm water drain collection sewers generally have grated and/or recessed inlets placed in a roadway's pavement and/or in the curb areas. The storm water is then conveyed through a storm sewer piping to an outfall in an existing drainage way, lake, stream, river, ocean and the like. Presently, no economically viable solution exists to remove the natural or manmade refuse, trash and the like, that inherently flows into the storm sewers. The natural and manmade refuse, trash and the like become pollutants in the water bodies in which they are later discharged. These pollutants can ruin the aesthetic appearance and are harmful to the natural plants and wildlife in rivers, streams, lakes and oceans where the discharged pollutants eventually settle. Typical ways for communities to keep the storm drain collection sewers clean and passable is through expensive maintenance programs that would generally includes sending out crews of several workers on a continuous basis to the drain sites.

Numerous types of flexible bag shaped filters have been proposed to solve the problem of preventing debris from entering storm water collection sewers. However, these bag filters when full are difficult and costly to remove and replace. Further, the material composition of the bag filters have a limited short lifespan. Furthermore, the bag filters restrict all storm water to run directly through the filter bag itself and thus when clogged with debris do not have the capability to allow the storm water to run around the bag. When clogged, the main flow of water into the drain sewers can be obstructed by the clogged bags and cause flooding damage to surrounding areas. Examples of the bag filters include: U.S. Pat. Nos. 4,268,390 to Cunningham; 4,419,232 to Arntyr; 4,793,728 to Ellis; and 5,372,714 to Logue, Jr.

Other techniques have also been proposed to help catch storm water debris. U.S. Pat. No. 5,133,619 to Murfae et at. describes a filter assembly for storm water sewers. However, the Murfae et al. device requires a "forklift" to use and is limited to being applied above existing curbs in FIG. 3, or must be placed upstream from existing sewer lines in FIG. 5. The Murfae et al. device is not practical because of it's weight limitations and elaborate and its expensive construction requirements of digging up and constructing additional basins in which to use the device.

U.S. Pat. Nos. 5,232,587 to Hegemier et al.; 5,284,580 to Shyh; and 5,297,367 to Sainz each describe using inlet filter type baskets for storm water sewers. However, each of these devices still can cause flooding to surrounding areas when the grated openings in the baskets become clogged. Also, none of these devices and those of the previously discussed prior art would be adaptable to various sized storm water collection sewers.

Thus, the need exists for a solution to the above presented problems.

SUMMARY OF THE INVENTION

The first objective of the present invention is to provide a device for removing debris that is readily sizable and insertable into existing storm water collection sewers.

The second object of this invention is to provide a debris removing device for storm water collection sewers that allows for overflow runoff.

The third object of this invention is to provide a debris removing basket device for storm water collection sewers that can be removed, when necessary, by a single worker.

The fourth object of this invention is to provide a long lasting and durable debris removing device for use with existing storm water collection sewers.

The fifth object of this invention is to provide a debris removing device that is adaptable for variable sized storm water collection sewers.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Preferred Embodiment

Figure 1:
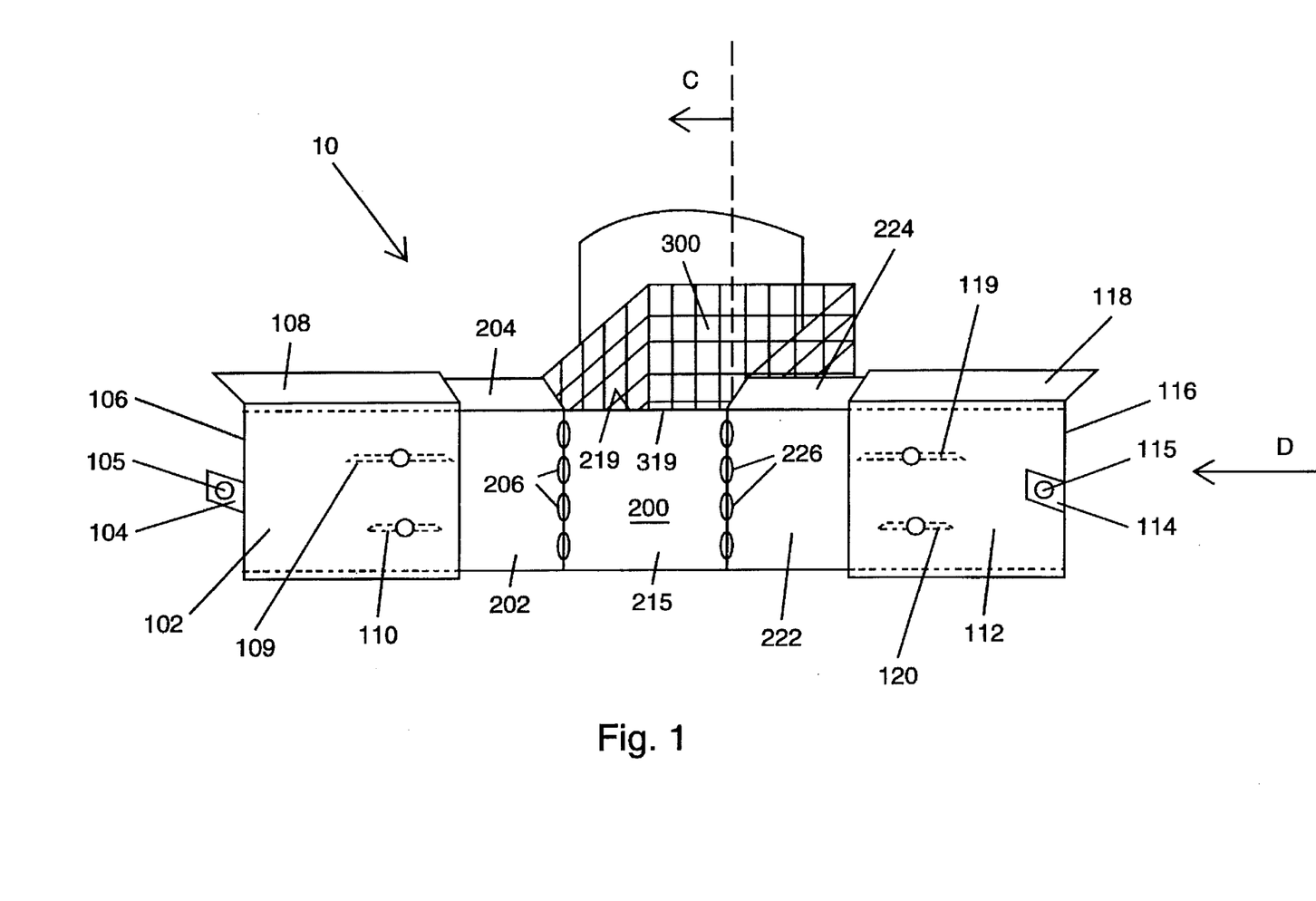
FIG. 1 is a perspective front view of a first preferred embodiment of the storm water invention

FIG. 1 is a perspective front view of a first preferred embodiment of the storm water invention 10. The invention 10 includes left sliding rectangular plate 102, left side wall tab 104 with hole 105 where a bolt(not shown) can be used to adhere the left slide rectangular plate 102 to the side wall inside of a storm water drain inlet which can better be seen in reference to FIGS. 7–8. Referring back to FIG. 1, left slide rectangular plate 102 further includes a left flat edge 106 which can alternatively be curved when the inside of the drain well walls are curved. Plate 102 also includes top longitudinal slot 109 and bottom longitudinal slot 110 both of which can be approximately 2 and ⅞ inches long and ⅜ of an inch thick. Plate 102 further includes a top angled rectangular deflector portion 108 which bends back approximately 128–135 degrees from the slide plate 102, the latter of which can better be seen in reference to FIGS. 6–8.

Figure 6:
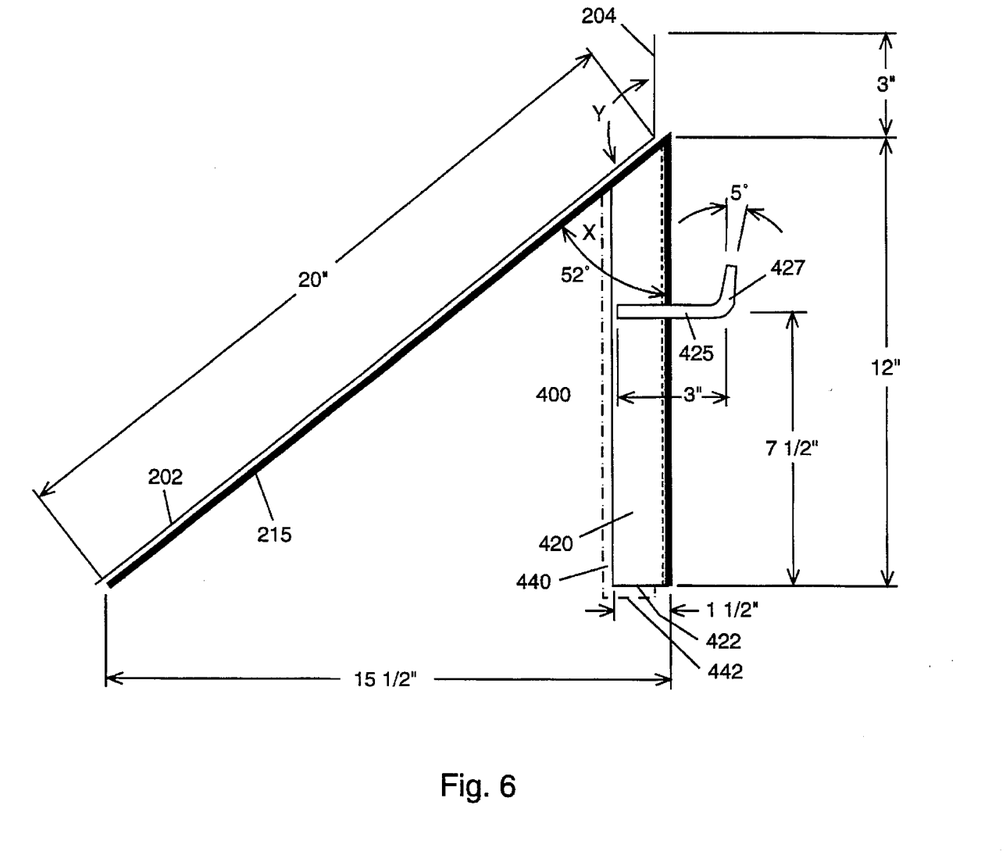
FIG. 6 is a cross-sectional side view of the frame support of the back wall frame of FIG. 1 along arrow C.
Figure 7:
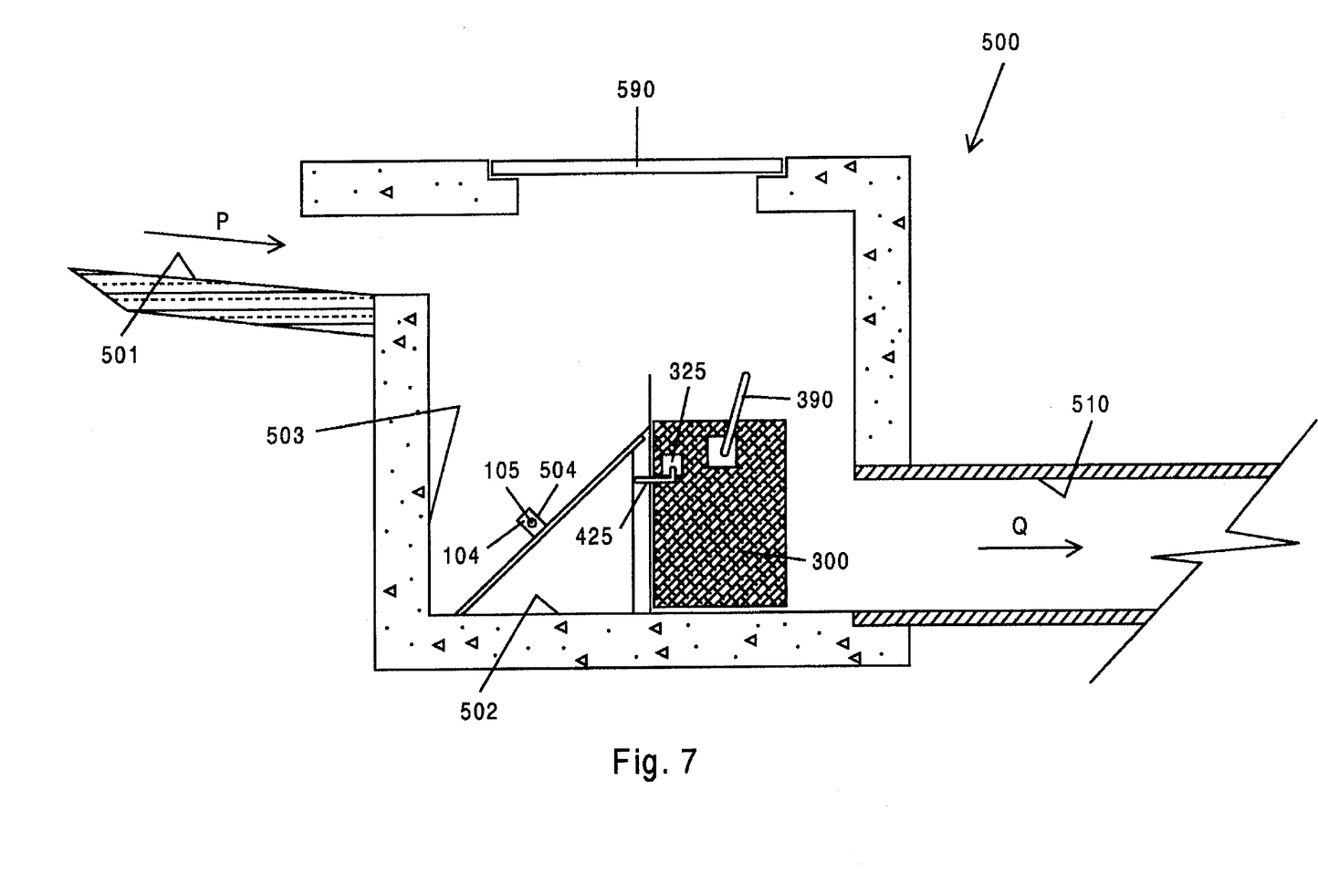
FIG. 7 is a side view of the first preferred embodiment invention of FIG. 1 along arrow D assembled in a storm water drain.
Figure 8:
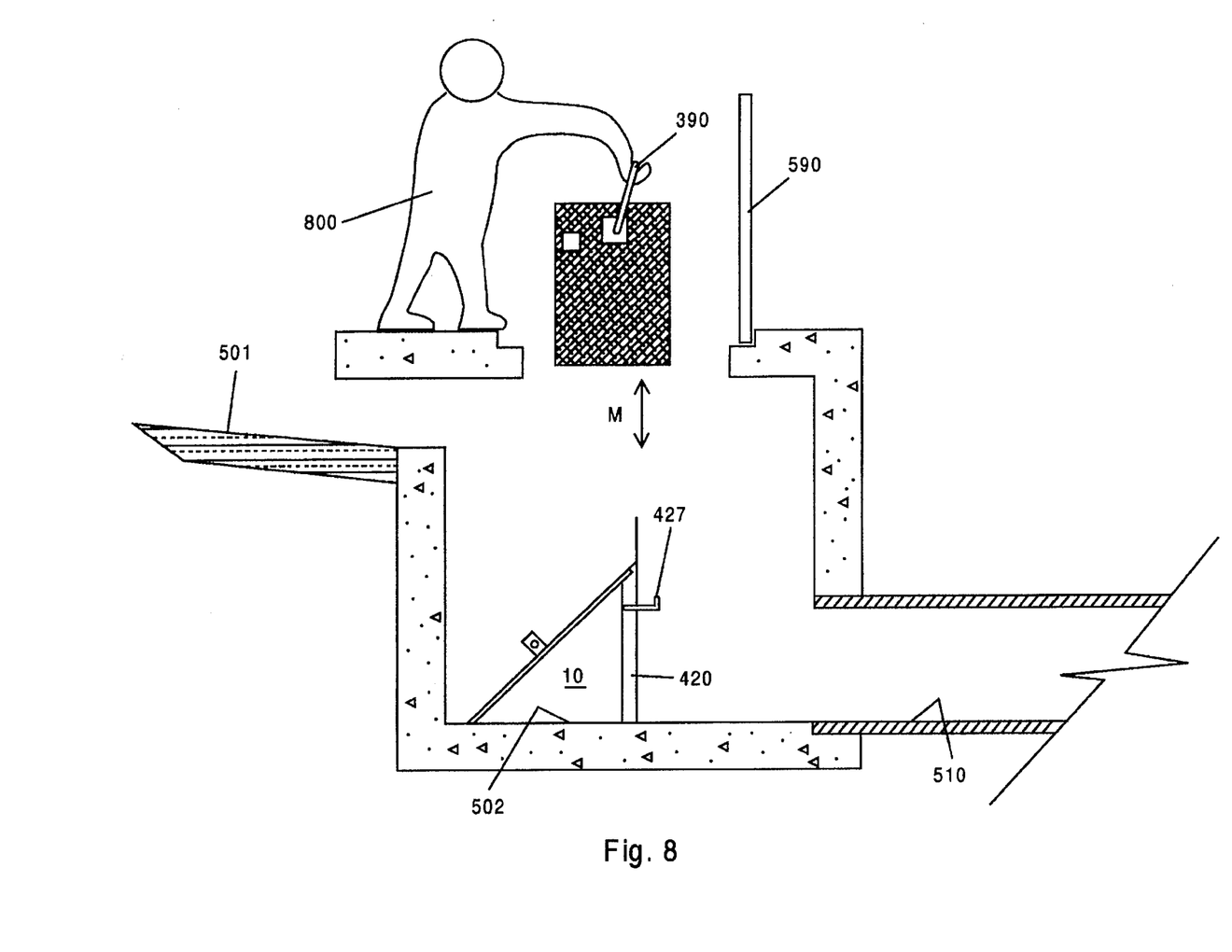
FIG. 8 illustrates the invention of FIG. 7 with the screen basket removed.

Referring to FIG. 1, invention 10 also includes right sliding rectangular plate 112, right side wall tab 114 with hole 115 where a bolt(not shown) can be used to adhere the right slide rectangular plate 112 to the side wall inside of a storm water drain inlet which can better be seen in reference to FIGS. 7–8. Referring back to FIG. 1, right sliding rectangular plate 112 further includes a right flat edge 116 which can alternatively be curved when the inside of the drain well walls are curved. Plate 112 also includes top longitudinal slot 119 and bottom longitudinal slot 120 both of which can be approximately 2 and ⅞ inches long and ⅜ of an inch thick. Plate 112 further includes a top angled rectangular deflector portion 118 which bends back approximately 128–135 degrees from the slide plate 102, the latter of which can better be seen in reference to FIGS. 6–8.

Figure 2:
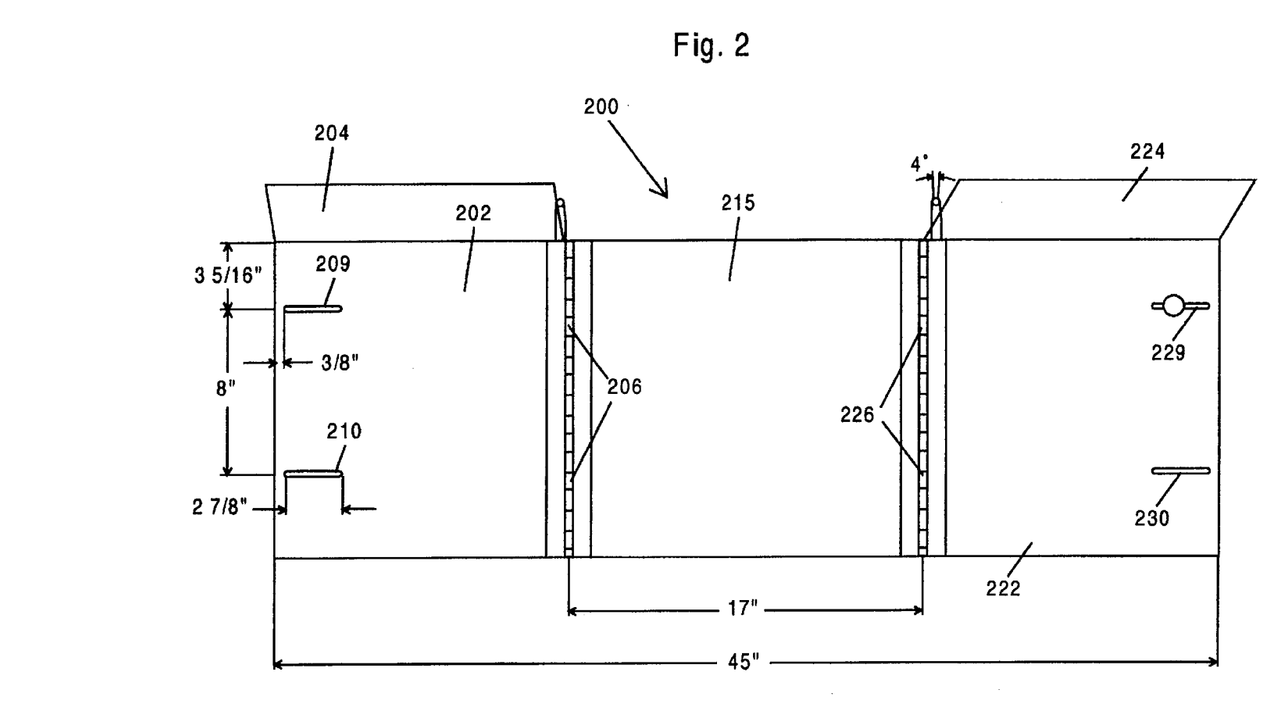
FIG. 2 is a front view of the foldable side wings with attached back wall of the invention of FIG. 1.
Figure 2A:
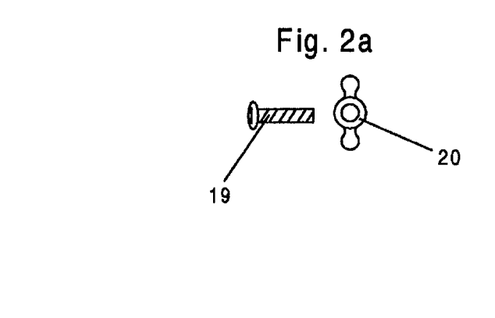
FIG. 2a shows a screw and nut used to attach outer slide plates to inner plates.

Behind plates 102 and 112 is the frame backing 200. FIG. 2 is a front view of the foldable side wings 202, 222 with attached back wall 215 of the invention 10 depicted in FIG. 1. Referring to FIGS. 1–2, backing 200 includes a left rectangular shaped wing 202 which has slob 209 and 210 which correspond in position and size behind slots 109 and 110 of plate 102. Wing 202 also has an angled rectangular deflector portion 204 and wing 202 is connected to rectangular back pane 215 by a row of left side hinges 206. Backing 200 further includes a right rectangular shaped wing 222 which has slots 229 and 230 which correspond in position and size behind slots 119 and 120 of plate 112. Wing 222 also has an angled rectangular deflector portion 224 and wing 222 is is connected to rectangular back panel 215 by a row of right side hinges 226. Unlike, the slide and wing plates, the back panel 215 does not have any top deflector portion the significance of which will become apparent later on. Back panel 215 has a top ridge portion 219 which is the same height as the inlet ridge portion 319 of basket 300. Note plural conventional screw 19 and nut 20 can be used to attach outer slide plates 202 and 222 to slide plates 102 and 112, respectively, through each of their respective longitudinal slots, 109, 110, 119, 120.

Figure 3:
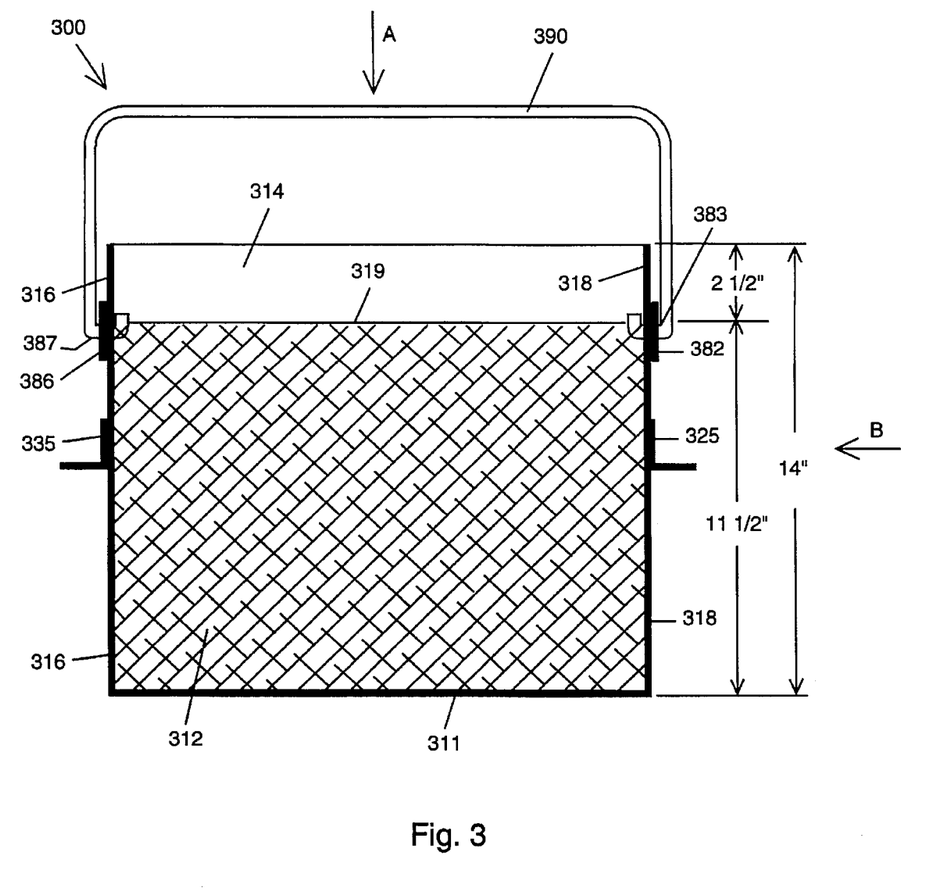
FIG. 3 is an exploded front view of the removable screen basket of the invention of FIG. 1.
Figure 4:
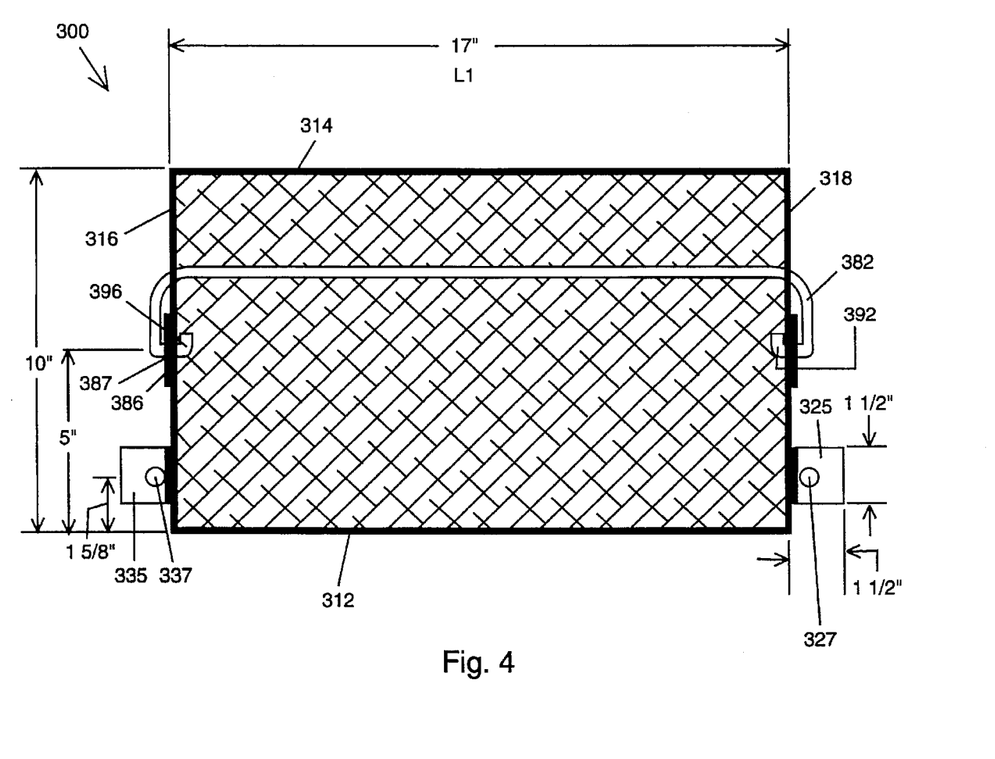
FIG. 4 is a top view of the removable screen basket of FIG. 3 along arrow A.
Figure 5:
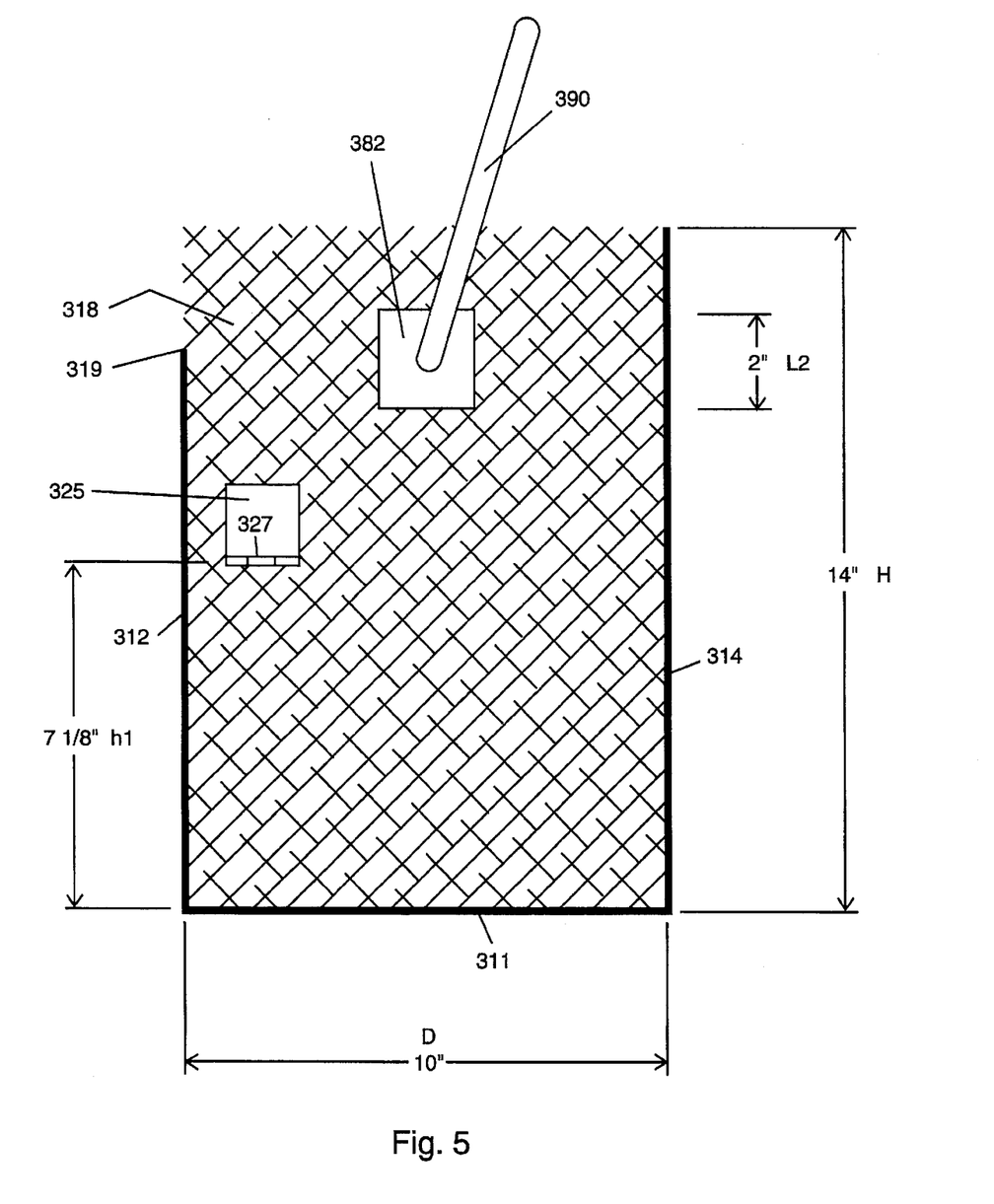
FIG. 5 is a side view of the removable screen basket of FIG. 3 along arrow B.

FIG. 3 is an exploded front view of the removable screen basket 300 of the invention 10 of FIG. 1. FIG. 4 is a top view of the removable screen basket 300 of FIG. 3 along arrow A. FIG. 5 is a side view of the removable screen basket 300 of FIG. 3 along arrow B. Referring to FIGS. 4–6, rectangular shaped basket 300 is comprised of screen/mesh metal of variable size openings along the front, back, sides and base. Basket 300 includes base portion 311 having a depth, D, of approximately 10 inches, front portion 312 which runs from base portion 311 to ridge 319 which is approximately 10 inches in height. Basket 300 includes rectangular sides 316 and 318 that each are sized of approximately 10 inches by a height, H, of approximately 14 inches. The rear of basket 300 includes back wall portion 314 having dimensions of approximately length, L1, of approximately 17 inches by a height, H, of approximately 14 inches. The lower height of front portion 312 allows ridge 319 to be even with the top of back pane 215 of FIG. 1. Referring to FIGS. 4–6, basket 300 includes side L-shaped brackets 325, 335 each having through openings 327, 337, respectively, the latter are used for supporting basket 300 to invention 10 and will be discussed later. Basket 300 further includes fixably attached side metal square plates 382, 386 (each approximately 2, ½ by 2 and ½ inches). Each bracket 382, 386 has slots 383, 387, respectively, for allowing bent ends 392 and 396 of handle 390 to be rotatably mounted thereon.

FIG. 6 is a cross-sectional side view of the frame support 400 of the back wall panel 215 of FIG. 1 along arrow C. FIG. 7 is a side view of the invention of FIG. 1 along arrow D assembled in a storm water drain 500. FIG. 8 illustrates the invention of FIG. 7 with the screen basket removed. Referring to FIGS. 6–8, back panel 215 has two side legs 420 and 440 running down from the top end corners 219. Legs 420, 440 each have bottom portions 422, 442, respectively, for contacting the floor area 502 of a storm water drain inlet 500. Back panel 215 can be set at an angle, X, of approximately 45 to 55 degrees, but preferably 52 degrees to legs 420, 440. Each of the legs 420, 440 have hook portions(one of which is shown). Leg 420 is shown having hook portion 425 with bent end 427 that receives the through-hole 327 of the L-shaped bracket 325 for supporting one side of the basket 300. The deflectors are oriented at an angle, Y, of approximately 128 to 135 degrees, but preferably 132 degrees to the panel on which they are connected. For example, deflector 204 has an angle, Y, of approximately 132 degrees to panel 202.

Figure 9:
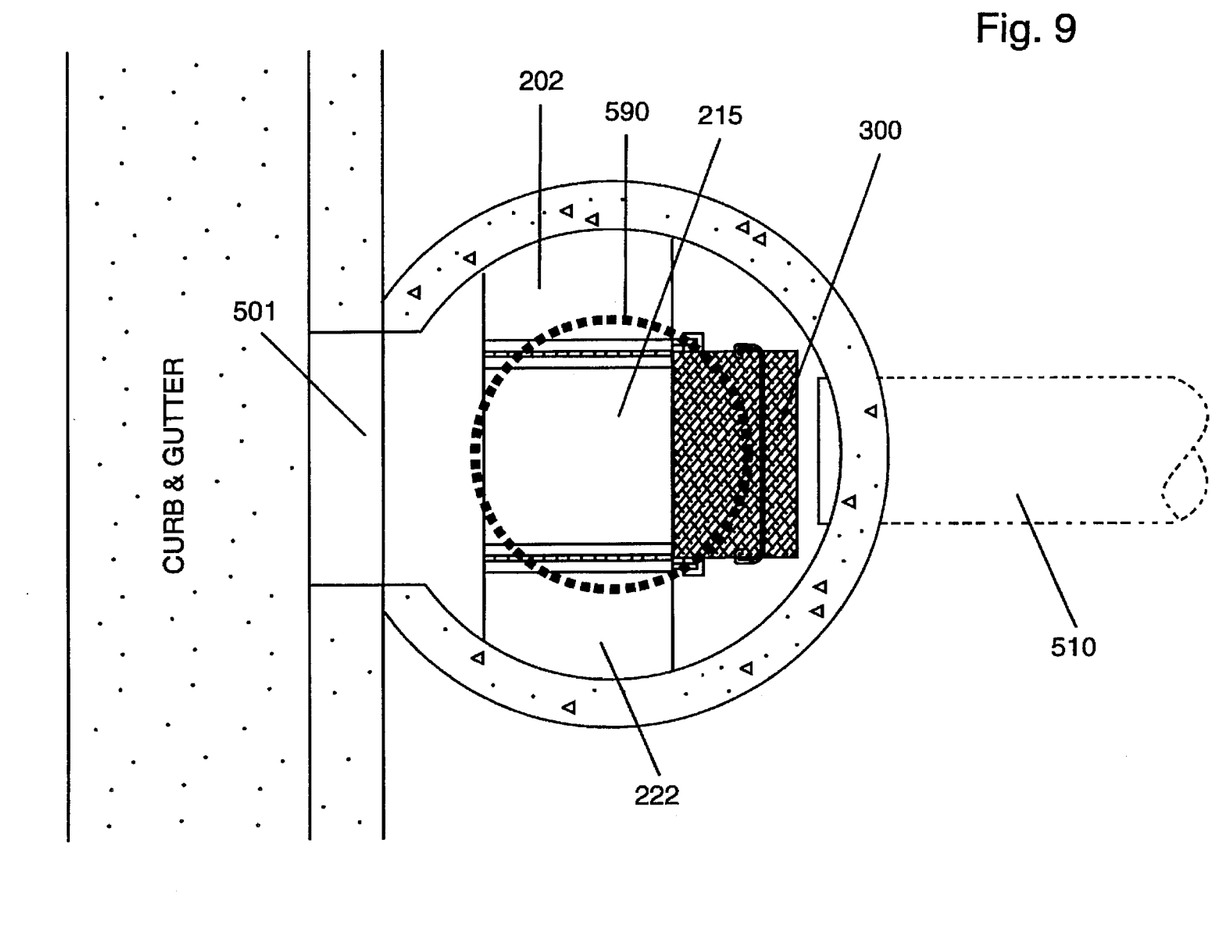
FIG. 9 is a top view of the assembled invention of FIG. 7 along arrow E.

Referring to FIG. 7 and FIG. 1, storm water including debris enters storm water drain inlet 500 from street level 501 along arrow P and exits along pipe 510 along arrow Q. Invention 10 is placed along the floor 502 between inlet wall area 503 and exit pipe 510. When assembled, the base of basket 300 is supported by hook portions 425 approximately one inch above floor 502. Storm water can fill the area in front of invention 10 and will be forced by the opening above ridges 219, 319 that is between deflectors 204 and 224 (see FIG. 1) and into basket 300. If basket 300 becomes clogged or filled, the invention 10, allows for storm water buildup to overflow side deflectors 108, 204, 119 and 224. FIG. 8 shows that a filled basket 300 can be removed by a single worker 800, by opening conventional manhole cover 590. FIG. 9 is a top view of the assembled invention of FIG. 7 along arrow E.

Referring to FIGS. 1, 2, 7, 8 and 9, the slidable rectangular plates 102, 112 can slide along until side tabs 104 and 114 contact side walls 509 of the drain inlet 500. In FIG. 7, side tab 104 is attached to side wall 509 by bolt 105. The slidable plates 102, 112 and foldable wings 202 and 212 (see FIG. 2) when folded together allow invention 10 to be easily inserted and removed into drain inlet 500 through manhole cover 590.

All materials for forming the panels, brackets, handles, baskets can be made of different types of materials but preferably rest resistant metal materials such as but not limited to galvanized steel, stainless steel and the like. The fixed attached components of the invention can be fixably attached to one another by hinging, soldering, welding and the like.

Alternatively other types of materials such as reinforced fiberglass and the like can also be used, as well as combinations of metal and fiberglass. For example, the sliding panels 102 and 112 of FIG. 1 can be fiberglass, and the wing plates 202, 222 can be galvanized steel.

Second Preferred Embodiment

Figure 10:
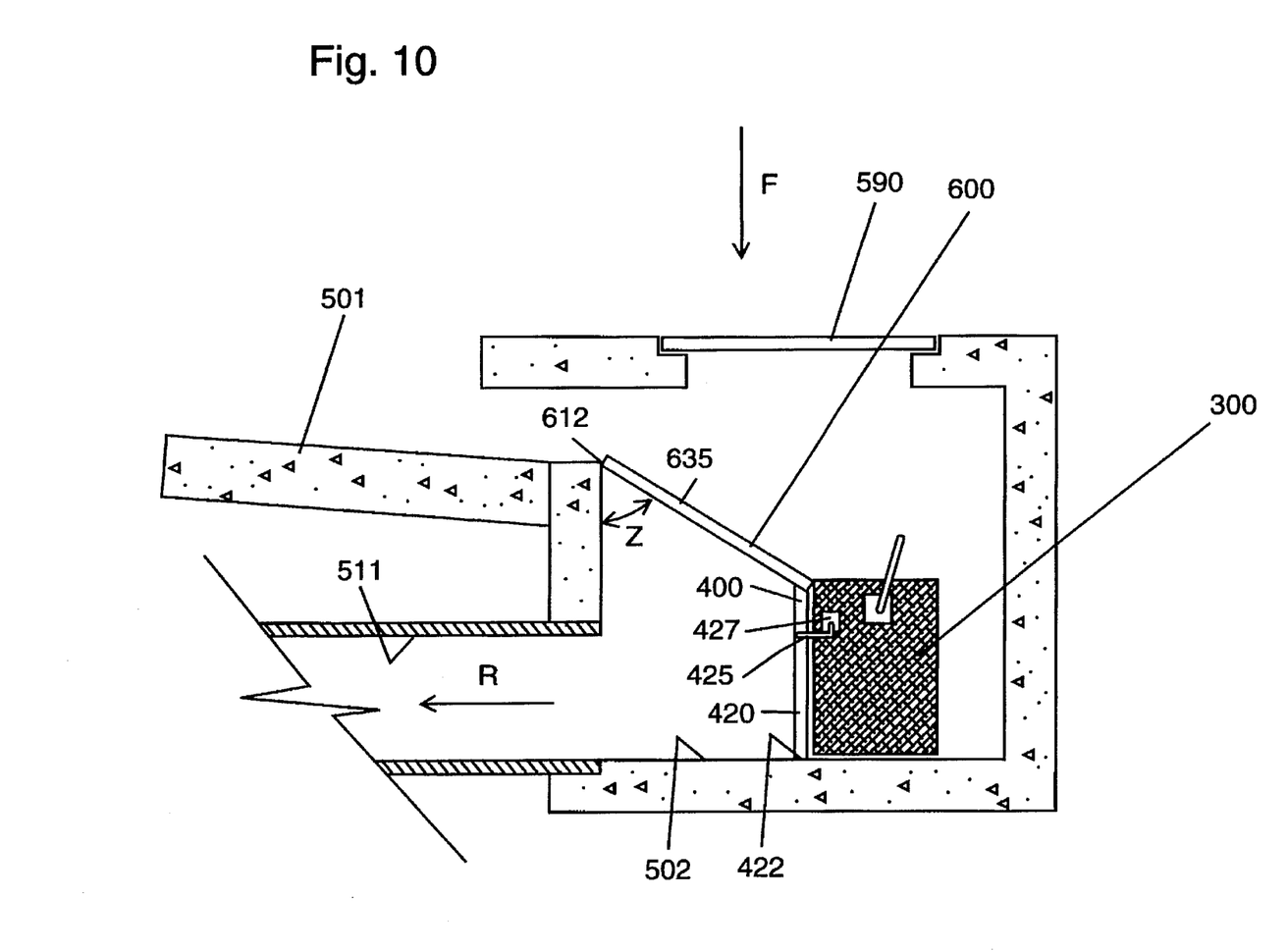
FIG. 10 is a side view of a second preferred embodiment of the invention assembled in a storm drain.

FIG. 10 is a side view of a second preferred embodiment of the invention having a chute ramp 600 assembled in a storm drain having an outlet 511 running beneath street level inlet 501 in the direction of arrow R. Unlike the first preferred embodiment, chute ramp 600 of FIG. 10 angles downward along arrow Z of approximately 25 to 75 degrees into basket 300. Frame support, basket 300 and their respective components 420, 422, 425, 427 correspond to and operate in a similar manner to the like components of the first preferred embodiment discussed previously. Frame support 400 has two side legs 420 and 440 (not shown) running down from the top end corners 219. Legs 420, 440 each have bottom portions 422, 442 (not shown), respectively, for contacting the floor area 502 of the storm water drain inlet. Each of the legs 420, 440 have hook portions (one of which is shown). Leg 420 is shown having hook portion 425 with bent end 427 that receives and supports each side of the basket 300.

Figure 11:
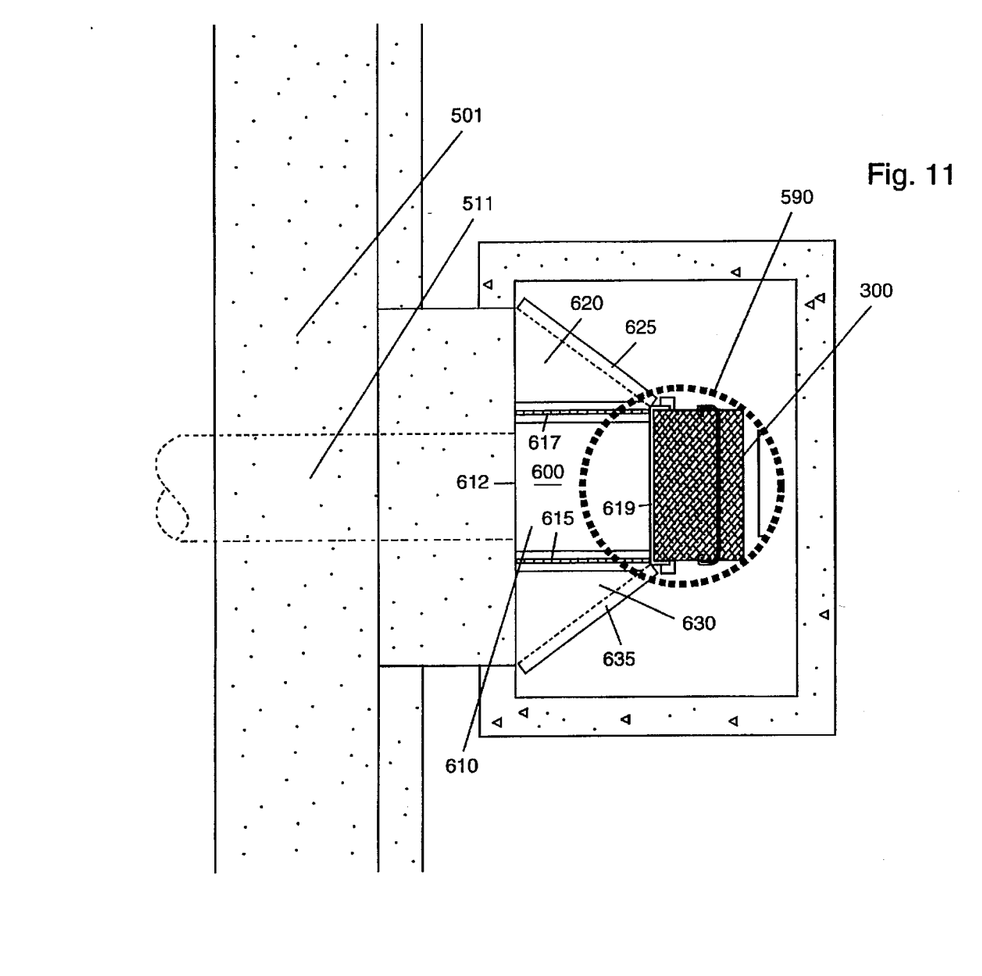
FIG. 11 is a top view of the assembled invention of FIG. 10 along arrow F.

FIG. 11 is a top view of the assembled invention of FIG. 10 including the chute ramp 600 along arrow F. Referring to FIGS. 10 and 11, chute ramp 600 includes central planar portion 610 connected by hinges 617 on one side to left triangular wing 620. Central ramp portion 610 is connected by another set of hinges 615 to right triangular wing 630. Both triangular wings 620 and 630 have respective outside tapered raised edges 625 and 635. Alternatively side edges 625 and 635 can be curved and or have raised ridges. Chute ramp 600 includes edge 612 which can rest on the side of inlet 501. Edge 619 corresponds to and operates similar to edge 319 depicted in the first preferred embodiment shown more clearly in FIG. 1. The remaining components, materials and operation of the second preferred embodiment of FIGS. 10–11 corresponds to those of the first preferred embodiment previously discussed. In FIGS. 10–11, the size of the basket 300 allows for overflowing water to run around the basket if the basket itself is filled. Thus, neither the first nor the second preferred embodiment will cause an obstruction in the storm water drain if the baskets themselves become filled with debris.

Although the side wings depicted in the preferred embodiments include side edges that are perpendicular to the top and bottom edges, the side edges can be constructed with angular or curved edges when the insides of the storm drain inlet have inclined or curved walls.

While the invention has been described for insertion into a storm water collection sewer with an inlet on the left side and an outlet pipe drain extending out an opposite side, the invention can be inserted into other types of storm water collection sewers with different directions for inlet and outlet pipe drains.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A removable storm water apparatus for being positioned within storm water collection sewers, comprising:

a left wing panel having a first side and a second side;

a central panel foldably connected to the second side of the left wing panel;

a right wing panel having a first side and a second side, the first side foldably connected to another side of the central panel; and a removable filtering basket located behind the central panel, wherein the left wing panel, the central panel, the right wing panel and the filtering basket are inserted within a storm water collection sewer in order to control and prevent debris from passing through the sewer.

2. The removable storm water apparatus of claim 1, further comprising:

a first sliding panel that is slidably attached to the left wing panel; and a second sliding panel that is slidably attached to the right wing panel.

3. The removable storm water apparatus of claim 2, further comprising:

an angled deflector along a top edge of the left wing panel;

an angled deflector along a top edge of the right wing panel;

an angled deflector along a top edge of the first slidable panel; and an angled deflector along a top edge of the second slidable panel, wherein a top edge of the central panel allows the storm water to flow into the basket.

4. The removable storm water apparatus of claim 2, further comprising:

a left tab for fixably attaching the first slidable panel to an interior side wall of the storm water collection sewer; and a right tab for fixably attaching the second slidable panel to another interior side wall of the storm water collection sewer.

5. The removable storm water apparatus of claim 1, further comprising:

an angled deflector along a top edge of the left wing panel; and an angled deflector along a top edge of the right wing panel, wherein an opening between the left wing angled deflector and the right wing angled deflector that is above a top edge of the central panel allows the storm water to flow into the basket.

6. The removable storm water apparatus of claim 5, further including:

the left wing panel deflector and the right wing panel deflector are each oriented at an angle of approximately 128–135 degrees to their respective wing panel.

7. The removable storm water apparatus of claim 6, further including:

the left wing panel deflector, the right wing panel deflector, the first slidable panel deflector, and the second slidable panel deflector, are each oriented at an angle of approximately 128–135 degrees to their respective panels.

8. The removable storm water apparatus of claim 1, further comprising:

a left hinge foldably connecting the left wing panel to the central panel; and a right hinge foldably connecting the right wing panel to the central panel.

9. The removable storm water apparatus of claim 1, further including:

a hook on a rear side of the central panel for supporting the basket.

10. The removable storm water apparatus of claim 1, wherein the front panel includes:

a ramp having an inlet side and an outlet side, the inlet side angled in a downward direction from an edge of a storm drain inlet at street level, and the outlet side of the ramp having an edge above the opening to the basket.

11. A removable storm water apparatus for being positioned into a storm water collection sewers, comprising:

a left wing panel having a first side and a second side;

an angled deflector along a top edge of the left wing panel;

a central panel foldably connected by a first hinge on one side to the second side of the left wing panel;

a right wing panel having a first side and a second side, the first side foldably connected by a second hinge to another side of the central panel;

an angled deflector along a top edge of the right wing panel, wherein the left wing panel, the central panel and the right wing panel are positioned within a storm water collection sewer; and a removable filtering basket located behind the front panel, the filtering basket being insertable and removable a single worker within the storm water collection sewer in order to control and prevent debris from passing through the sewer.

12. A removable storm water apparatus for use within storm water collection sewers, comprising:

a left wing panel having a first side and a second side;

an angled deflector along a top edge of the left wing panel;

a central panel foldably connected by a first hinge to the second side of the left wing panel;

a right wing panel having a first side and a second side, the first side foldably connected by a second hinge to another side of the central panel;

an angled deflector along a top edge of the right wing panel;

a first sliding panel that is slidably attached to the first side of the left wing panel and having an opposite side for attachment to an interior wall of a storm collection sewer;

a second sliding panel that is slidably attached to the second side of the right wing panel, and an opposite side for attachment to another interior wall of the storm collection sewer, wherein the left wing panel, the central panel and the right wing panel are positioned within a storm water collection sewer; and a removable filtering basket supported behind the front panel by a hook, the filtering basket being insertable and removable by a single worker within the storm water collection sewer in order to control and prevent debris from passing through the sewer.

13. A removable storm water apparatus for being positioned within storm water collection sewers, comprising:

a left triangular wing having a base edge, a longitudinal edge perpendicular to the base edge, and an angled raised edge;

a central panel having a first side and a second side, the first side foldably connected the longitudinal edge of the left triangular wing;

a right triangular wing having a base edge, a longitudinal edge perpendicular to the base edge, and an angled raised edge, the longitudinal edge of the right triangular wing foldably connected to the second side of the central panel; and a removable filtering basket located behind the central panel, wherein the left wing panel, the central panel, the right wing panel and the filtering basket are positioned within a storm water collection sewer in order to control and prevent debris from passing through the sewer.

* * * * *